March 27, 1945. F. SENYAL 2,372,340
FILTER AND WATER PURIFIER
Filed March 28, 1944
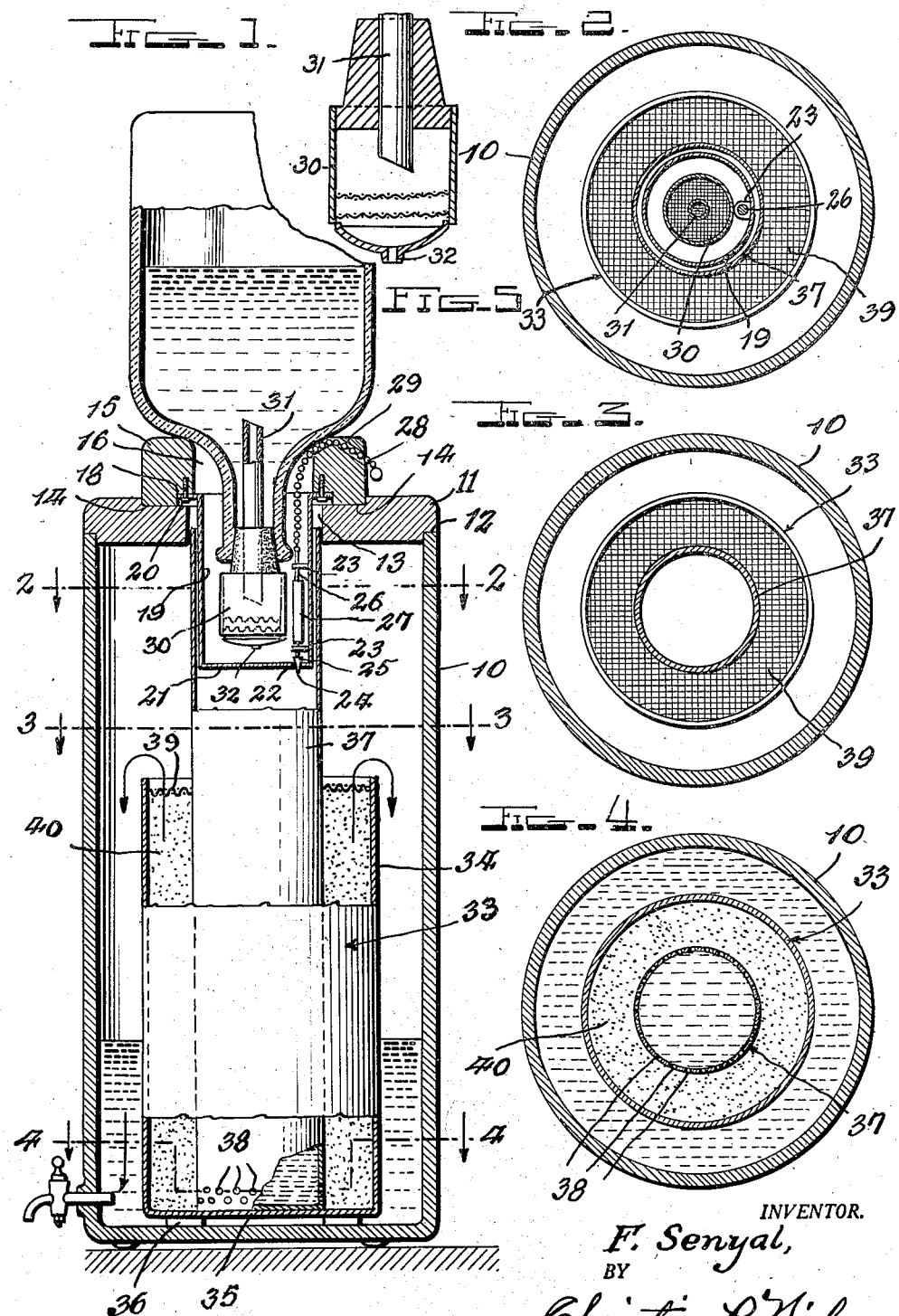
INVENTOR.
F. Senyal,
BY
Christian R. Nielsen
ATTORNEY Patented Mar. 27, 1945

2,372,340

UNITED STATES PATENT OFFICE 2,372,340

FILTER AND WATER PURIFIER

Frank Senyal, New York, N. Y.

Application March 28, 1944, Serial No. 528,434

2 Claims. (Cl. 210—101)

This invention relates to a filter and water purifier of the type shown in my Patent #2,335,-458, issued November 30, 1943.

It is a particular object of the invention to provide a filter and purifier in which the liquid is caused to have an upward flow through a filtering material in a slow steady manner, thereby insuring intimate contact with the filtering material.

It is also an object of the invention to provide a filter of simple construction and of few parts which may be readily disassembled for the purpose of cleaning and renewal of the filter material.

It is also an object of the invention to provide a novel construction of combined strainer and closure stopper for the water receptacle.

Additional objects, advantages and features of invention will be apparent from the following description considered in conjunction with the accompanying drawing, wherein Figure 1 is a vertical section, partly in elevation, illustrating the filter and purifier employed in conjunction with a water cooler.

Figure 2 is a cross section on the line 2—2 of Figure 1.

Figure 3 is a cross section on the line 3—3 of Figure 1.

Figure 4 is a cross section on the line 4—4 of Figure 2.

Figure 5 is a vertical section through the combined strainer and closure stopper.

There is illustrated a water cooler or reservoir 10 which is shown as cylindrical, having a plain open top for receiving a closure ring 11, the latter being provided with an annular rabbet 12 affording a snug fit within the open top of the water cooler.

The closure ring 11 is formed with a central opening 13 and concentric therewith an annular recess 14 is provided in the upper surface of the ring, forming a seat for a bottle supporting collar 15, the latter having an opening 16 for reception of the neck of a bottle 17. Upon the underside of the collar 15 there is a recess 18 forming a seat for the flange of a liquid receiver 19 secured thereto by means of screws or the like 20.

The receiver 19 is a cylindrical casing of suitable diameter and length, the bottom wall 21 being apertured, as at 22, for controlled outlet of water, as will be described. A pair of apertured lugs 23 are fixed upon the inner wall of the casing, the apertures being in alignment with the aperture 22. A valve 24 is employed, and as shown comprises a head 25 complemental to the aperture 22, having a stem 26 reciprocable through the apertures of the lugs 23. A weight 27 is secured upon the stem normally urging the head 25 into the opening 22. The upper end of the stem 26 has a chain 28 secured thereto, threaded through a bore 29 formed in the collar 15. The weight of the bottle upon a portion of the chain will maintain the valve 24 in a desired adjusted position. By threading the chain through the bore it will be held against displacement when the bottle is removed for refilling.

The bottle 17 is provided with a combined stopper and strainer 30, the former mounting a feed tube 31, of a length to extend into the bottle, and the latter having a discharge port 32 whereby liquid will be discharged into the receptacle 19. The tube 31 is longitudinally adjustable within the stopper.

A filter element 33 is employed consisting of a filter receptacle 34 having a closed bottom 35 including foot members 36 for support of the receptacle upon the base of the reservoir 10. Mounted concentrically within the receptacle 34 there is a liquid receiving and conducting sleeve 37 closed at the lower end and resting upon the base 35 of the filter receptacle. The sleeve 37 is of a length and diameter to receive the receptacle 19 therewithin, as clearly shown in Figure 1. Above the closed end of the sleeve a plurality of apertures 38 are formed, extending circumferentially therearound, permitting passage of liquid into the filter receptacle 34.

The receptacle 34 has a screen 39 at its upper open end for maintaining the filter material within the receptacle, but allowing ready passage of liquid into the reservoir 10.

The operation is substantially as follows: Water to be purified and filtered is placed in the bottle 17 together with chlorine and a coagulating material such as aluminum sulphate. The bottle is then closed by inserting the stopper into the mouth of the bottle, and is now inverted so as to position the neck of the bottle within the collar 15, as shown in Figure 1. After a short period of time the chlorine will have destroyed bacteria in the water and any dirt will have been precipitated because of the coagulating property of the sulphate of alumina. The tube 31 projects above any precipitated material so that only pure water may pass into the receptacle 19. By slightly tilting the bottle the chain 28 may be drawn upwardly to raise the valve 24, permitting water to pass into the sleeve 37, through apertures 38 and into the filter material 40. Water will accumulate in the receptacle 34 gradually rising upwardly through the filter material, through the screen 39 for discharge into the cooler 10.

Water will rise in the cooler to a level of the lower end of the tube 31, and when it is necessary to replenish water in the bottle 17, the latter is simply removed. The valve 24 automatically seats in the outlet 24 under action of gravity and urged by the weight 27.

While I have shown and described by construction specifically, this is by way of illustration only, and I consider as my own all such modifications in construction as fairly fall within the scope of the appended claims.

I claim:

1. A combined water filter and purifier comprising a reservoir having an open top, a closure ring engaged in the open top and having an axial opening and a concentric recess in the upper face thereof, a bottle supporting collar seated in said recess, said collar having a liquid receiver depending therefrom, a filter member within the reservoir, said filter member consisting of an upwardly open receptacle adapted to seat upon the base of the reservoir, a sleeve within the receptacle of a length to accommodate the liquid receiver within the open end thereof, said sleeve having a closed bottom and apertures formed in the walls of the sleeve above the bottom for discharge of water into the filter receptacle, filter material in the last named receptacle, a screen member at the open end of the filter receptacle, an inverted bottle disposed within the supporting collar, said bottle having a combined stopper and screen in the mouth thereof forming communication with the interior of the bottle for discharge of water into the liquid receiver, said receiver having an outlet in the bottom wall thereof for discharge of liquid into said sleeve, a gravity actuated valve complemental to said outlet and said valve including a flexible member adapted to be engaged by said bottle for maintaining the valve in open position.

2. The structure of claim 1 in which the bottle supporting collar is provided with a bore extending from the exterior to the interior of the collar, the flexible member being threaded through the bore and having a portion exposed for engagement by said bottle for maintaining the valve in open position and a weight member on said valve to effect gravitational movement of the valve to closed position upon release of said flexible member.

FRANK SENYAL.